United States Patent
Moore et al.

(10) Patent No.: US 10,236,018 B2
(45) Date of Patent: Mar. 19, 2019

(54) SYSTEMS AND METHODS FOR DETECTION OF A TARGET SOUND

(71) Applicant: SOLTARE INC., Edmonton (CA)

(72) Inventors: Brian Moore, Edmonton (CA); Viet Hoang, Edmonton (CA); Ken Brizel, Edmonton (CA); Siamak Akhlaghi Esfahany, Edmonton (CA); Ajay Sandhu, Edmonton (CA)

( * ) Notice: Subject to any disclaimer, the term of this patent is extended or adjusted under 35 U.S.C. 154(b) by 0 days.

(21) Appl. No.: 15/909,799

(22) Filed: Mar. 1, 2018

(65) Prior Publication Data

US 2018/0261237 A1    Sep. 13, 2018

Related U.S. Application Data

(60) Provisional application No. 62/465,548, filed on Mar. 1, 2017, provisional application No. 62/529,657, filed on Jul. 7, 2017, provisional application No. 62/548,337, filed on Aug. 21, 2017.

(51) Int. Cl.
| | |
|---|---|
| *G10L 25/51* | (2013.01) |
| *H04R 29/00* | (2006.01) |
| *H04R 1/32* | (2006.01) |
| *H04L 29/08* | (2006.01) |

(52) U.S. Cl.
CPC .............. *G10L 25/51* (2013.01); *H04R 1/326* (2013.01); *H04R 29/00* (2013.01); *H04L 67/12* (2013.01)

(58) Field of Classification Search
None
See application file for complete search history.

(56) References Cited

U.S. PATENT DOCUMENTS

| | | |
|---|---|---|
| 3,997,868 A | 12/1976 | Ribnick |
| 5,287,411 A | 2/1994 | Hill |
| 6,362,749 B1 | 3/2002 | Brill |
| 6,570,992 B1 | 5/2003 | Folan et al. |
| 6,958,707 B1 | 10/2005 | Siegel |
| 7,675,431 B1 | 3/2010 | Caouette, Sr. |
| 7,791,499 B2 | 9/2010 | Mohan |
| 9,224,294 B1 | 12/2015 | St. John |
| 9,275,136 B1 | 3/2016 | Sharifi |
| 9,397,630 B2 | 7/2016 | Wang et al. |
| 2004/0258252 A1 | 12/2004 | Inoue et al. |
| 2007/0008175 A1 | 1/2007 | Johnson |

(Continued)

FOREIGN PATENT DOCUMENTS

| | | |
|---|---|---|
| WO | WO9931637 | 6/1999 |
| WO | WO2003091066 A2 | 11/2003 |

*Primary Examiner* — Paul Huber
(74) *Attorney, Agent, or Firm* — Bennett Jones LLP

(57) ABSTRACT

A system for detection of a target sound in an environment of a vehicle, includes an audio sensor, a computer processor, and a memory storing digital target sound templates produced by converting samples of the target sound in accordance with conversion parameters. The computer processor receives the sample sound signal from the audio sensor, converts the sample sound signal to a digital sample vector in accordance with the conversion parameters, compares the vector to each of the templates to determine if a degree of similarity of the vector to any one of the templates exceeds a predetermined threshold value, and notifies a user or a vehicle control system if the threshold value is exceeded.

20 Claims, 10 Drawing Sheets

(56) References Cited

U.S. PATENT DOCUMENTS

| | | | |
|---|---|---|---|
| 2007/0146127 A1* | 6/2007 | Stilp | G08B 1/08 |
| | | | 340/531 |
| 2007/0216539 A1 | 9/2007 | D'Antoni | |
| 2009/0125311 A1 | 5/2009 | Haulick et al. | |
| 2009/0179774 A1 | 7/2009 | Mohan | |
| 2009/0322559 A1 | 12/2009 | Yen | |
| 2011/0199230 A1 | 8/2011 | Stahlin | |
| 2011/0296794 A1 | 12/2011 | Thomas et al. | |
| 2014/0350927 A1* | 11/2014 | Yamabe | G10L 21/0232 |
| | | | 704/233 |
| 2015/0382102 A1 | 12/2015 | Akino | |
| 2018/0211528 A1 | 7/2018 | Seifert | |

* cited by examiner

SYSTEMS AND METHODS FOR DETECTION OF A TARGET SOUND

CROSS-REFERENCE TO RELATED APPLICATIONS

This application claims priority to the following U.S. Provisional Patent Applications: U.S. Ser. No. 62/465,548 filed on Mar. 1, 2017; U.S. 62/529,657 filed on Jul. 7, 2017; and U.S. 62/548,337 filed on Aug. 21, 2017, and the entire contents of each are incorporated herein by reference for all purposes.

FIELD OF THE INVENTION

The present invention relates to audio sensor systems and signal processing to detect a target sound, such as may be used in vehicular applications to detect target sounds, such as the sound of a siren.

BACKGROUND OF THE INVENTION

Highway traffic laws in most jurisdictions require vehicles to yield to emergency vehicles. However, the cabins of modern automobiles are well insulated from outside noise, and the use of sirens and their volume may be limited to prevent noise pollution. These and other factors may make it difficult for drivers to detect siren sounds produced by emergency vehicles. Also, semi or fully autonomous vehicles must be able to detect emergency vehicles to operate safely and within the law.

Sensing systems in automotive applications may use a variety of sensor types, but each is associated with drawbacks. Optical systems using cameras that capture images, or optical sensors to capture reflected light (lidar), are limited by "line-of-sight", are relatively expensive, and require powerful processors to deal with large amounts of data. Radar systems that detect reflected radio waves are less data-intensive, but provide far less information. Systems that detect reflected ultrasound waves are useful only in short ranges, and are limited to applications such as parking-assist sensors.

Systems using audio sensors face challenges. First, such systems need to be sensitive enough to detect and discriminate faint noises at a distance, without being overwhelmed by loud noises at close distances. Second, detectable sounds vary significantly in different environments and operating conditions. For example, North American emergency vehicle sirens typically have a pitch that varies cyclically within a band of between about 500 Hz to about 2000 Hz, but the frequency range and cycle period still varies greatly between different sirens, while European sirens typically alternate between two discrete frequencies. Further, the perceived pitch of the siren may be significantly higher or lower as a result of the Doppler Effect caused by relative motion between the emergency vehicle and the sensing automobile.

There is a need in the art for an effective automotive audio detection system for detecting emergency vehicle sirens.

SUMMARY OF THE INVENTION

In one aspect, the present invention comprises a system for detection of a target sound, the system comprising at least one audio sensor for generating a sample sound signal in response to a sample sound wave; and a computer processor and a non-transitory computer readable memory operatively connected to the computer processor, and storing a plurality of digital target sound templates produced by converting a plurality of samples of the target sound in accordance with conversion parameters, and a set of instructions executable by the computer processor to implement a method comprising the steps of:

(a) receiving the sample sound signal from the audio sensor;

(b) converting the sample sound signal to a digital sample vector in accordance with the conversion parameters;

(c) comparing the sample vector to each of the templates to determine if a degree of similarity of the vector to any one of the templates exceeds a predetermined threshold value; and (d) generating an output signal if the threshold value is exceeded.

In one embodiment, the system comprises at least three audio sensors, and the method comprises, for each of the at least three audio sensors, performing steps (a) to (c) of claim 1, determining a time index for an exceedance of the threshold value; and determining a direction angle of the sample sound wave based on the determined time indices.

In one embodiment, the target sound is a siren that sweeps between lower and upper frequency limits, and the templates represent data limited to either a narrow frequency band within the lower and upper frequency limits; or at least one specific frequency within the narrow frequency band.

In another embodiment, the target sound is a siren that alternates between a lower frequency and a higher frequency, and the templates represent data limited to either a lower narrow frequency band centered on the lower frequency, and a higher narrow frequency band centered on the higher frequency; or at least one specific frequency within each of the lower and higher narrow frequency bands.

In one embodiment, the system further comprises a logarithmic amplifier operatively connected to the audio sensor for amplifying the sample sound signal before being converted to the vector. The logarithmic amplifier may comprise a feedback loop from an output terminal to an input terminal of the logarithmic amplifier, wherein the feedback loop comprises parallel first and second circuit paths, wherein the first circuit path comprises a first diode, and the second circuit path comprises a second diode, wherein the first diode and the second diode have different polarities relative to the input and output terminals of the logarithmic amplifier such that the logarithmic amplifier provides a symmetric output voltage for positive and negative input voltages.

In one embodiment, the conversion parameter comprises an n-bit encoding of the sound signal, wherein n is less than or equal to 8, and preferably is 1, 1.5 or 2. In one exemplary embodiment, n is 1, and the conversion parameter is a voltage level crossing.

In one embodiment, one or both of the sample vector and the target sound template is less than about 10,000 bits long, or 5000 bits long, or 1000 bits long, or 100 bits long.

In one embodiment, the system comprises two or more audio sensors and the sound signal from each audio sensor is separately processed through steps (a) to (d). If there are three or more audio sensors, and the sound signal from each audio sensor is separately processed with a time index component, the difference in time indices is used to determine a relative direction of the target sound. The direction of the target sound may be determined periodically to determine relative movement of the target sound.

In one embodiment, the system may comprise a notification subsystem to provide sound detection information to a human user or to an automated system, wherein the information may comprise one or more of the identity of the target sound, the relative location of the target sound, or the relative movement of the target sound.

In another aspect, the invention may comprise a method for detection of a target sound, the method comprising the steps of:

(a) providing at least one digital target sound template produced by converting at least one sample of the target sound in accordance with conversion parameters;

(b) receiving a sample sound signal generated by at least one audio sensor in response to a sample sound wave;

(c) converting the sample sound signal to a digital sample vector in accordance with the same conversion parameters;

(d) comparing the sample vector to the at least one template to determine if a degree of similarity of the vector to the at least one template exceeds a predetermined threshold value; and (e) generating an output signal if the threshold value is exceeded.

In one embodiment, at least two sample sound signals are generated by at least two audio sensors, and the method further comprises the step of, for each of the at least two audio sensors, performing steps (b) to (d), and determining a time index for an exceedance of the threshold value; and determining a direction of the target sound based on a difference between the determined time indices.

In one embodiment, the method may further comprise the step of logarithmically amplifying the sample sound signal before being converted to the sample vector.

In one embodiment, the conversion parameter may comprise an n-bit encoding of the sound signal, wherein n is less than or equal to 8, and preferably wherein n is 1, 1.5 or 2. In one embodiment, n is 1, and the conversion parameter is a voltage level crossing.

In one embodiment, one or both of the sample vector and the target sound template is less than about 10,000 bits long, or 5000 bits long, or 1000 bits long, or 100 bits long.

In one embodiment, steps (b) to (e) of the method are performed on-board a vehicle in real-time, and the target sound is produced by a siren.

In one embodiment, steps (c) and (d) of the method involve only integer math.

In another aspect, the invention may comprise a continuous method of detecting a target sound in real time, comprising the steps of (a) receiving sample sound signals generated by at least one audio sensor in response to sample sound waves; (b) logarithmically amplifying the sample sound signals and converting the amplified sample sound signals to a digital sample vector in accordance with conversion parameters; (c) comparing the sample vector to at least one template produced from the siren using the same conversion parameters to determine if a degree of similarity of the vector to the at least one template exceeds a predetermined threshold value; and (d) generating an output signal if the threshold value is exceeded. Preferably, step (c) involves only integer math.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

Definitions

Any term or expression not expressly defined herein shall have its commonly accepted definition understood by a person skilled in the art. As used herein, the following terms have the following meanings.

"Audio sensor" refers to a device that detects and converts a sound wave into an electrical signal. In an embodiment, an audio sensor may be a microphone.

"Computer processor" refers to an electronic device that is capable of processing an input electronic signal to produce an output electronic signal. In embodiments, a computer processor may include one or more devices commonly referred to as a programmable logic controller, a printed circuit board, an integrated circuit, and the like. A "computing device" comprises at least one computer processor.

"Non-transitory computer-readable memory" refers to a tangible medium capable of storing data and/or instructions in a format readable by a computer processor. In embodiments, a non-transitory computer-readable memory may include magnetic media, optical media, or solid-state media.

"Target sound" refers to a specific sound of interest to be detected. A target sound may be within the human audible spectrum, or outside of the human audible spectrum (e.g., ultrasonic sounds in excess of 20 kHz). As non-limiting examples, a target sound may be the sound produced by an emergency vehicle siren, a horn of another vehicle, a crosswalk assistance sound for visually impaired pedestrians, skidding tires indicating a vehicle losing control, a vehicle colliding with another vehicle or an object, animal noises or human voices.

"Vehicle" refers to a device used to transport people and goods. As a non-limiting example, a vehicle may be an automobile, motorcycle, truck or bus. A vehicle may be non-autonomous, semi-autonomous, or fully autonomous.

"Vehicle control system" refers to a system that controls any aspect of a vehicle's dynamics, or that provides information relevant to controlling any aspect of a vehicle's dynamics. A vehicle control system is distinguished from a vehicle entertainment system that is used to entertain a vehicle's driver or occupants. For example, a GPS navigation system may be considered part of a vehicle control system, as it provides useful information to a driver regarding a vehicle's direction of travel, even though the GPS navigation system may be bundled with what is conventionally referred to as an "infotainment" system.

Overview.

Figure 1:
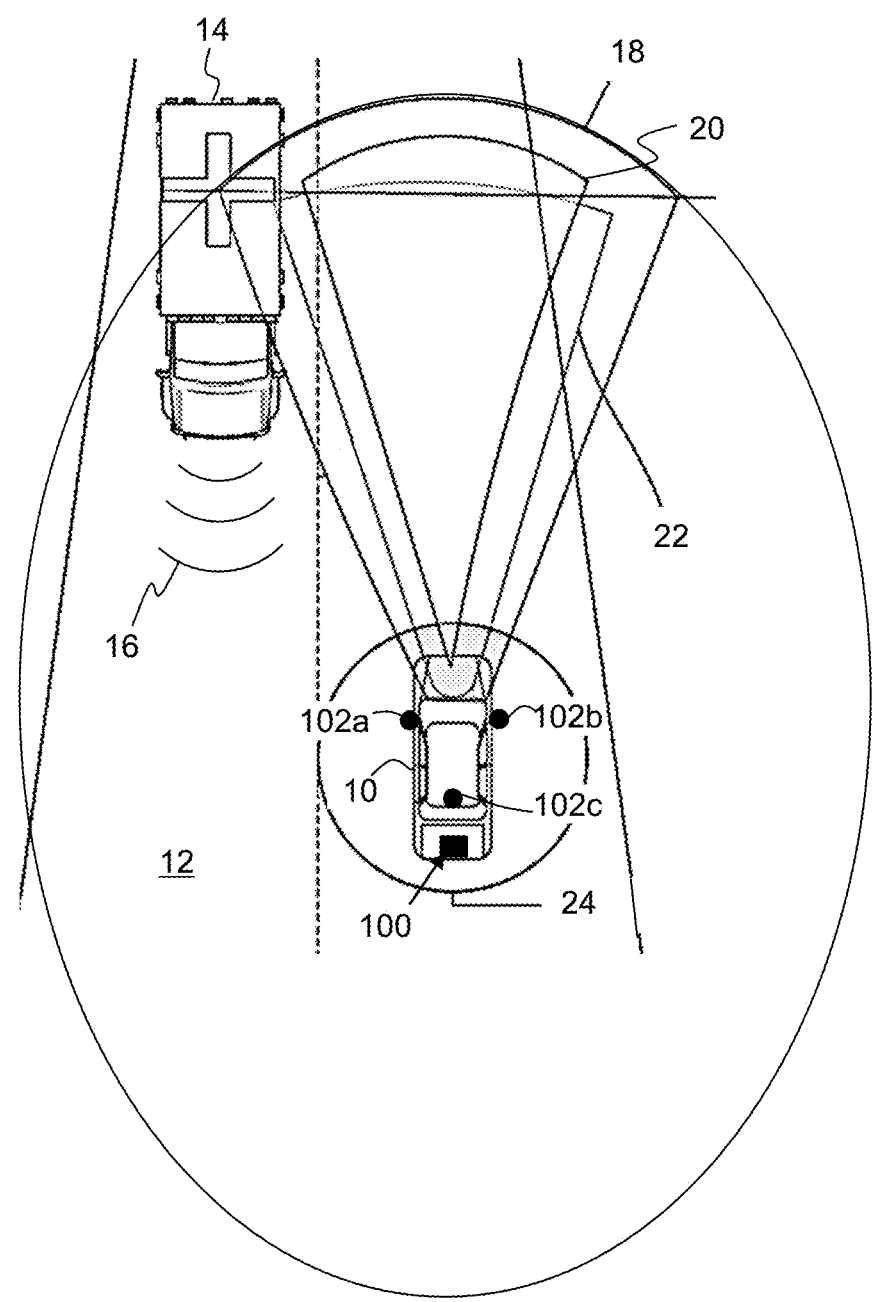
FIG. 1 shows a vehicle equipped with an embodiment of a system of the present invention, and an emergency vehicle emitting a siren sound, while travelling on a roadway.

FIG. 1 shows a vehicle (10) on a roadway (12) with an approaching emergency vehicle (14) emitting a siren sound as depicted by sound waves (16). The vehicle (10) is equipped with an embodiment of the system (100) of the present invention for detecting the siren sound as a target sound, having a detection range denoted by the zone (18). In this example, the vehicle (10) is also equipped with an optical sensing system, a radar sensing system, and an ultrasound sensing system having detection ranges denoted by zones (20), (22), and (24), respectively. The system (100) may be installed in the vehicle (10) during original manufacturing or as an aftermarket system during a retrofit operation. Multiple systems (100) may be synchronized by a computing device onboard the vehicle, or may be self-synchronized by a vehicle network, or by peer-to-peer synchronization.

Figure 2:
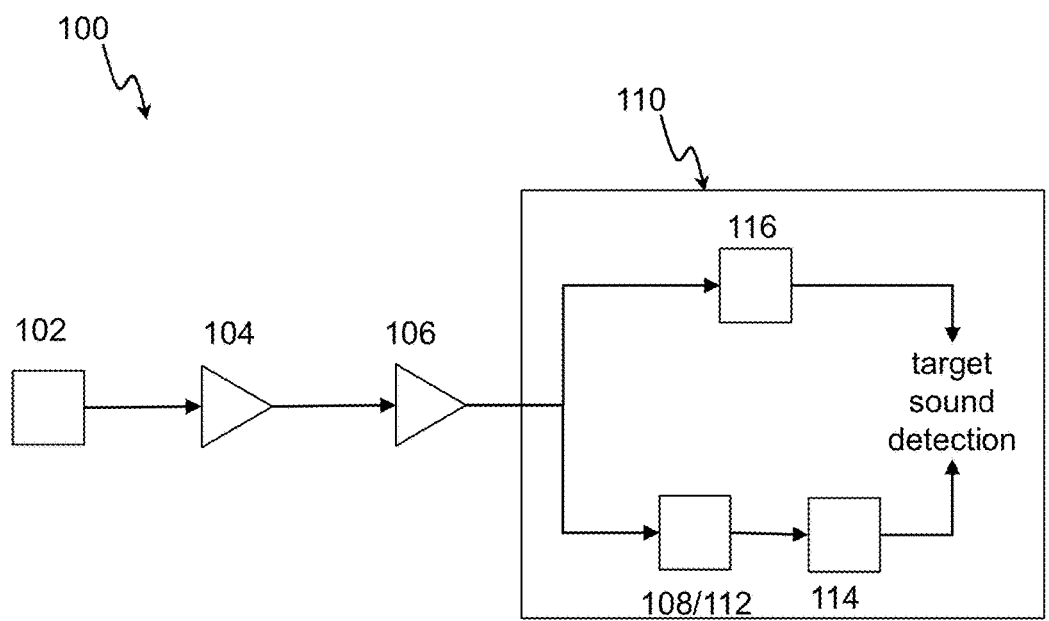
FIG. 2 is a schematic depiction of an embodiment of a system of the present invention.
Figure 3:
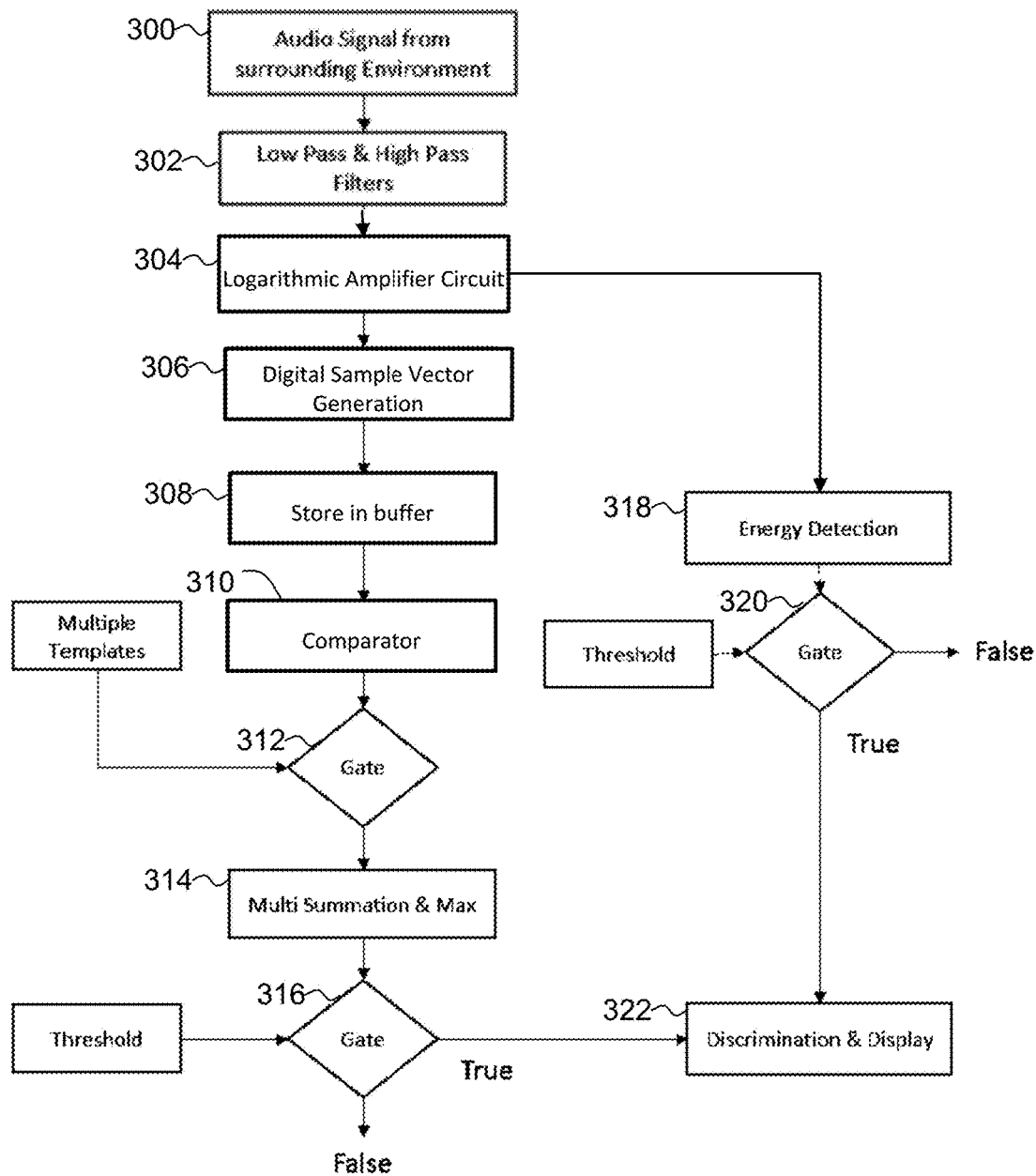
FIG. 3 is a flow chart of an embodiment of a method of the present invention.

FIG. 2 is a schematic depiction of an embodiment of a system (100) of the present invention, and FIG. 3 is a flow chart of an embodiment of a method of the present invention. In these embodiments, at least one audio sensor (102) generates a sample sound signal in response to detected sample sound waves (step 300). Optionally, a filter (104) filters the signal by frequency (step 302). Optionally, a logarithmic amplifier circuit ("log amp") (106) amplifies the filtered signal (step 304), as described below. The analog signal is then received by the analysis module (110) and the sample sound signal is converted from analog form to a digital sample vector (step 306) in a voltage level detector (108) which effectively functions as an analog-to-digital (A/D) converter.

The sample vector is stored in a buffer (step 308) for processing. The analysis module (110) includes a comparator (112) that compares the sample vector to stored digital target sound templates. A correlator (114) determines a metric for the degree of similarity between the vector and the templates to detect the target sound (steps 310 to 316). Optionally, the analysis module (110) includes an energy detector (116) which uses a measure of amplitude to confirm the detected target sound has sufficient energy to be the target sound in proximity to the vehicle (10) (steps 318 to 320). If the analysis module (110) detects the target sound, then it generates an output signal to notify a vehicle control system (step 322). In embodiments, the analysis module (110) may also determine and output information about the source of the target sound, such as its distance, direction, and velocity, relative to the vehicle (10).

In embodiments, the system (100) processes signals continuously and in real-time to provide notification of detection of the target sound. "Continuously" refers to processing signals at a periodic frequency. "Real-time" refers to processing signals without substantial delay after producing the signal. In embodiments, real-time processing occurs within 1 minute, and preferably within less than 1 second of the production of the signal. In embodiments, the processing is performed on-board the vehicle (10), at least every few seconds, with outputs generated at least every few seconds.

The components of the system (100) and the steps of the method are described in greater detail below.

Audio Sensor.

The at least one audio sensor (102) detects sound waves in the environment of the vehicle (10), and converts them into an electrical sample sound signal for processing by the system (100) (FIG. 3, step 300). In embodiments, the audio sensor (102) is a microphone. Preferably, the microphone is omnidirectional in the plane of the road travelled by the vehicle (10), however, where a plurality of microphones are used, the microphones may be directional individually, but omnidirectional when combined.

In one example shown in FIG. 1, the system (100) has three audio sensors (102a, 102b, 102c) in the form of microphones. One microphone is attached to each side mirror of the vehicle (10), and one microphone is attached to the roof of the vehicle (10) near the "shark fin" style antenna provided on the roof of many modern vehicles.

The use of multiple, spatially-separated audio sensors (102) enables determination of the direction (localization) of the source of the target sound, for example, by triangulation. Multiple audio sensors (102) may also enable enhanced and more precise discrimination of the target sound by reducing the effect of clutter, multipath, and other impairments in the acoustic environment. In general, the further the audio sensors (102) are apart, the better the triangulation. In a clean environment, a minimum of two sensors are required to obtain some localization information, and three audio sensors (102) are required for triangulation. However, in the real world with impairments and external noise sources, a greater number of audio sensors (102) may provide a more robust solution. For example, in one embodiment, the system has four or more audio sensors (102) to provide 360° of coverage around the vehicle (10).

In embodiments, the audio sensors (102) may be attached to the vehicle (10) in a variety of ways and locations. For example, microphones may be conveniently installed in light assemblies around the periphery of the vehicle (10), such as a headlight, fog light or driving light, taillight, side marker or signal light assembly. As another example, a microphone may be located in a housing that is attached to the vehicle (10). The housing may include other sensing devices such as cameras, radar, lidar and ultrasonic sensors, or other devices on the exterior of the vehicle (10) such as side-mirrors, roof top antennas, headlights, taillights, bumpers or flashing lights. While the microphone may be physically integrated with other sensors in the housing, data may be transmitted from the different sensors using different vehicle networks.

Filter.

The filter (104) may be a physical device which filters the sample sound signal received by the audio sensor (102) to a desired frequency band, or may be an electronic device which filters the sample sound signal produced by the audio sensor (FIG. 3, step 302), or both. Filtering may reduce downstream computational requirements. Both low-pass and high-pass band filters may be provided.

For example, many emergency sirens sweep over a frequency range of between about 500 Hz to about 2,000 Hz in a repeating pattern. In such examples, the filter (104) may be used to filter the sample sound signal to frequencies in the range of about 500 Hz and about 1.5 kHz. As a non-limiting example, the filter (104) may be a noise cancellation device such as that described in co-pending, co-owned U.S. Provisional Patent Application No. 62/500,987, filed on May 3, 2017, and used to attenuate sound below about 500 Hz.

Log Amp Circuit.

The log amp (106) logarithmically amplifies incoming low amplitude sample sound signals in the presence of relatively high amplitude background noise, while dampening high amplitude sample sound signals to a comparable range for low amplitude sounds (FIG. 3, step 304). By dampening high amplitude (loud) noises, while maintaining sensitivity to the signal from much lower amplitude (fainter) noises, the system (100) may be able to process sample sound signals generated by the audio sensor (102) that vary by orders of magnitude.

Figure 4A:
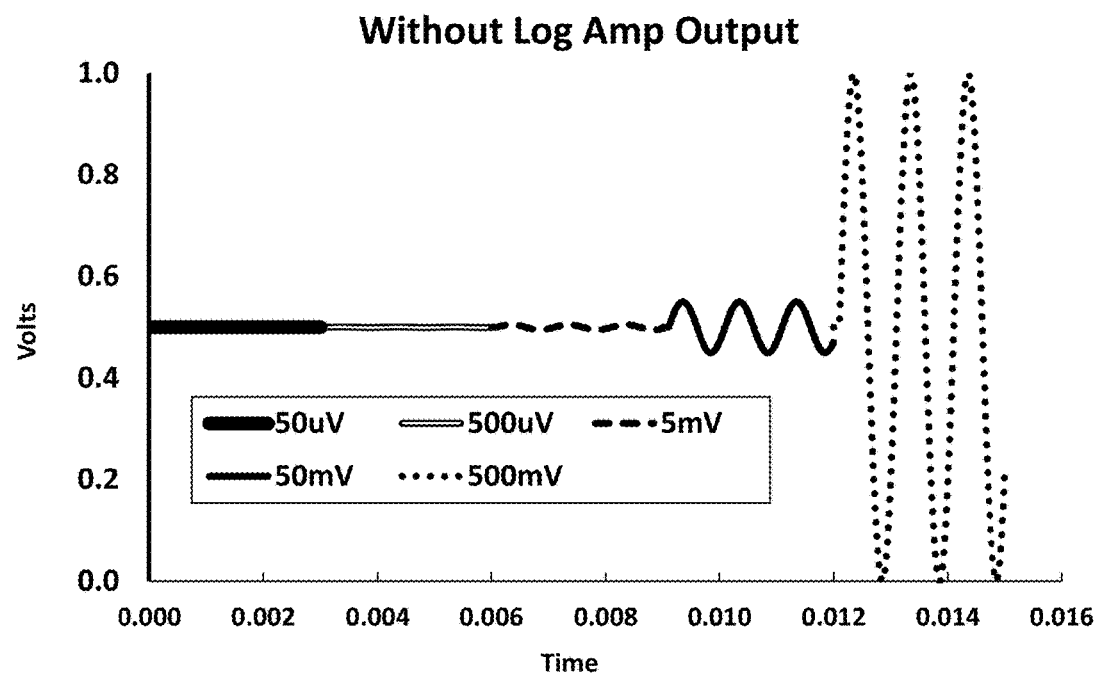
FIGS. 4A and 4B are charts showing the output voltage of a non-logarithmic amplifier and a logarithmic amplifier, respectively, for a range of input voltages.
Figure 4B:
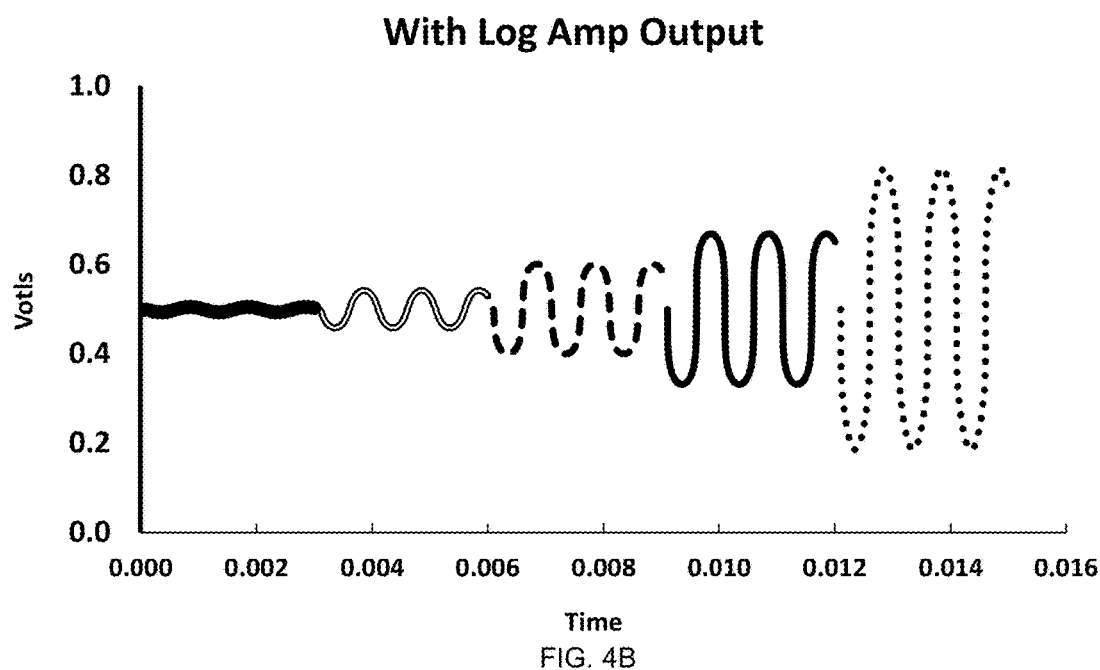

Log amps are known in communications technology to calculate the log of an input signal's envelope. A log amp (and logarithmic amplification) may be distinguished from a non-logarithmic amplifier ("non-log amp") by the relationship between its output voltage, $V_{out}$, and input voltage, $V_{in}$. FIGS. 4A and 4B show examples of a non-log amp output, and a log amp output, respectively, for input voltages ranging from 50 uV to 500 mV. A non-log amp produces an output voltage, $V_{out}$, having a magnitude that varies linearly with the input voltage, $V_{in}$. Accordingly, the smaller voltages may not be discernable by the system (100), while the larger voltages may exceed the system capacity. In contrast, a log amp circuit produces an output voltage $V_{out}$, that varies with the natural logarithm of the ratio between the input voltage, $V_{in}$, and normalization constant in volts, $V_{ref}$, multiplied by a scale factor, K, as expressed by the below equation.

$$V_{out} = K \ln\left(\frac{V_{in}}{V_{ref}}\right)$$

Figure 5:
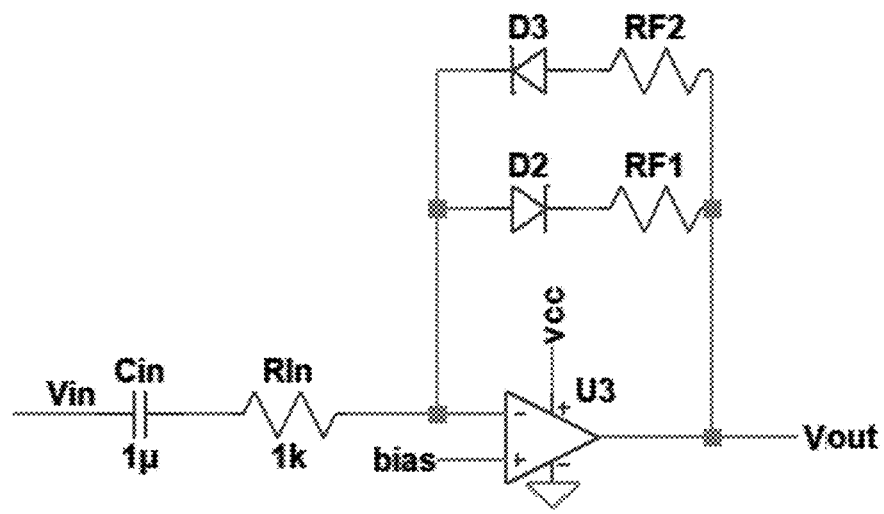
FIG. 5 is a schematic diagram of an embodiment of a logarithmic amplifier of the present invention.

FIG. 5 shows a simplified schematic diagram of an embodiment of a log amp (106) of the present invention. This embodiment of the log amp (106) is differentiated from a typical Automatic Gain Control (AGC), which is typically used to handle large variations of signal. AGC type methods are slower, and require many signal cycles to adjust their gain. In contrast, suitable embodiments of the log amp (106) have almost instantaneous response to signals with no impactful delay and thus respond almost instantly to signal changes.

In the embodiment shown in FIG. 5, diodes (D2, D3) are used in a feedback loop of an operational amplifier to provide a symmetric logarithmic output voltage, $V_{out}$, for a given input voltage, $V_{in}$. Symmetry in the amplification is desirable because voltages from a microphone will have excursions in the positive and negative directions. Other non-linear elements can be used, but this illustrates one embodiment for producing a logarithmic response to the linear input.

While a log amp with a single diode in the operational amplifier feedback loop would produce a non-symmetrical output for positive and negative inputs, using back-to-back diodes in the feedback loop of the amplifiers produces a hyperbolic function of the input symmetric around a zero or bias point ($V_b$). At low signal levels, the gain is very high and proportional to the ratio of the (diode impedance (D2, D3)+series resistors ($RF_x$)), divided by the input resistance $R_{in}$. At high input levels, the diodes allow more current, the dynamic feedback resistance goes down, and the gain goes down in proportion. This is sufficiently close to a logarithmic response at higher signal levels, and produces a linear, but high, gain at lower signal levels.

A/D Converter.

Figure 6:
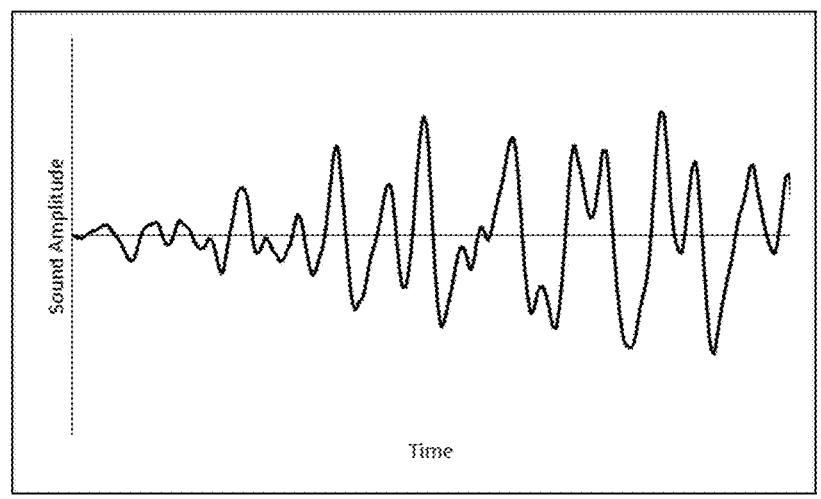
FIG. 6 is a chart of the amplitude variation over time of an analog sample sound signal to be processed by the present invention.

The sample sound signal received from the audio sensor (102) is in analog form, such as shown in the example in FIG. 6. The A/D converter (108) converts and reduces the analog sample sound signal to a digital sample vector of suitable length, at a predefined sampling rate (FIG. 3, step 306). The sample vector is stored and refreshed in a buffer for processing (FIG. 3, step 308).

In general, the larger the digital sample vector, the more accurate the detection system may be, but at the cost of processing time and effort. In one example, the vector may comprise a single bit data string comprising a number (N) of bits. In embodiments, N may vary between about 1,000 bits to about 10,000 bits. Preferably, N is less than about 5,000 bits, but still provides the ability to discriminate match and non-match comparisons. In one exemplary embodiment, N is about 4,000 bits.

A greater sampling rate may increase the accuracy of the detection system, but again at the cost of processing time and effort. In embodiments, the sampling rate may vary from about 1 kHz to about 20 kHz. In one example, the sampling rate may be 10 kHz.

In one embodiment, the conversion comprises an n-bit correlation of at least one aspect of the signal, where n<12, and preferably n<8. For example, the conversion may comprise a 1-bit (2 level encoding) or 1.5 bit (3 level encoding) conversion of signal phase shifts. In one example, the A/D converter (108) is a voltage level detector, which detects whether the signal has crossed zero into positive or negative territory, or crossed a level which may not be zero, but which still provides a characteristic sample vector. The use of a 1 bit or 1.5 bit correlation reduces the size of the extracted digital representation, which allows for rapid processing in the comparison steps. In an alternative example, multi-level encoding may be used, provided the final file size is still manageable. This conversion to low level encoding reduces the computational resources and time required to process the audio data, particularly when compared to existing fast Fourier transform (FFT) based methods that require much higher levels of encoding (e.g., 16-bit or even 24-bit). The method presented here is therefore more amenable to implementation in real-time using smaller and lower-cost components with lower power consumption.

Thus, the sample vector will comprise or consist of a string of bits, the number of which depends on the sampling rate and time. For example, a 4000 bit sample vector taken at 10 kHz, represent 400 ms of audio sample length.

Digital Target Sound Templates.

The digital target sound templates may be produced a priori from known target sounds (e.g., emergency vehicle siren sounds or signatures) using the conversion method, including the same vector size and sampling rate as the digital sample vector, and stored in a non-transitory computer readable memory.

Classical signal processing theory suggests that data sampling at twice the highest expected frequency of the target sound will be sufficient to completely characterize the information content with no loss of fidelity or information. Typical systems sample over this rate to achieve some robustness. For example, a sample of the target sound for a siren may be sampled at 4 kHz if the highest expected sound of the siren is 2 kHz. The period of the siren is also important. For example, a siren pattern lasting 2 seconds stored at 4 kHz sampling would result in a total template vector of 8 k samples at a bit level, or 1 kB of data in the template. This compares favorably to a typical sound file from a digital recording of 2 seconds, which if sampled at 44 kHz at 24 bits, results in a file of about 2.1 Megabits or 264 kB.

If the templates are much longer than the size of the sample vectors (N) in order to fully capture the siren signature, then they may be broken down into a number of N-bit long templates to be compared in parallel with the N-bit long sample vectors. For example, where N=4000, the 8000 bit template referred to be above may be divided into a number of 4000 consecutive bit templates for comparison purposes (i.e., bits 1 to 4000, bits 1001 to 5000, bits 2001 to 6000, etc.) This would allow the system (100) to identify sounds with a longer period without needing to wait for a whole period to finish.

Because of the favorable computational efficiency in working with bit-wise data, a multiplicity of templates can be matched with the incoming sounds in parallel, which allows for the storage and comparison of a large number of different templates for target sounds. For example, templates can include Doppler-shifted variants and other known variants of target sounds.

If the template used represents a particular target sound such as a specific type of siren, then the detection system will be specific to that type siren, and may not be useful to detect Doppler-shifted variants. Other siren types with different frequency ranges and/or periods, or even large Doppler shifts will not be recognized as the siren.

In order to detect other types siren types with different frequency ranges and/or periods, and/or to address the effect of large Doppler shifts, additional templates could be used. While including more templates renders the system more general in terms of the types of sirens that can be detected, it may also make the system more prone to false positives as well, triggering on other sounds it is not meant to detect.

As an alternative to increasing the number of templates, the templates may be limited to a number of specific frequency, or a narrower frequency range, approximately centered in the siren sweep range. In embodiments, the frequency range may be about 900 Hz or less. Because the templates are limited to a narrow frequency band, or a limited number of specific frequencies, they may be greatly reduced in size. In one embodiment, the templates may be 64 bits (N=64), greatly reducing the computational requirements and time even further. Also, the filter (104) may be used to filter incoming sounds detected by the audio sensors (102) to the desired frequencies or frequency range to reduce computational requirements and time even further.

Figure 7:
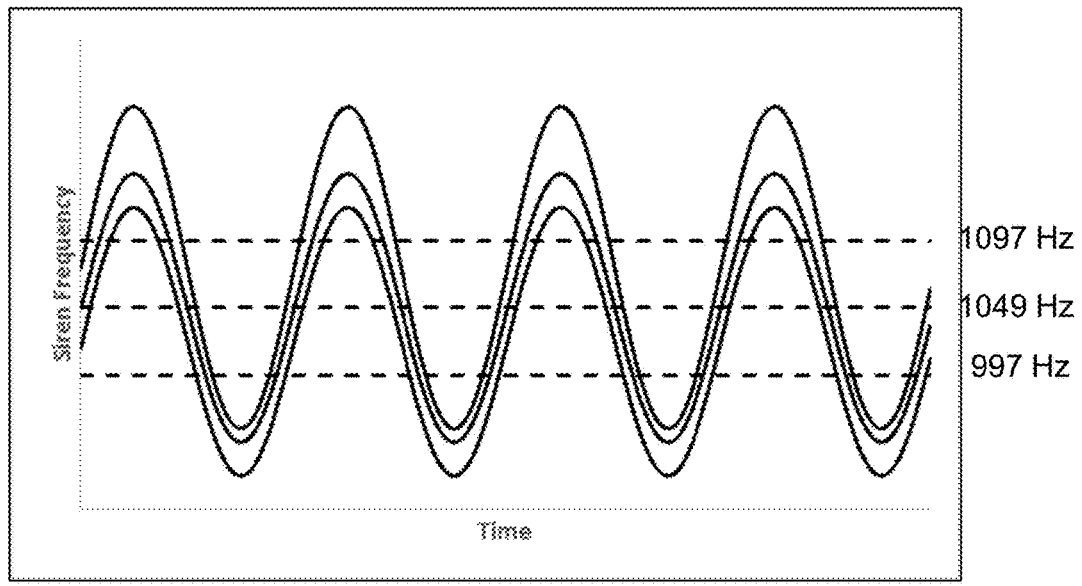
FIG. 7 is a chart showing an example of the frequency variation over time for a siren sweep, its lower and higher Doppler-shifted variations, and three detection frequencies.

For example, FIG. 7 shows the variation in frequency of a siren sweeping through its range over a short time period, as well as a higher and a lower Doppler shifted versions of the same siren. A siren wailing between 500 to 1500 Hz moving towards a listener at a relative 200 km/h will present sound waves at about 600 to about 1800 Hz, a 20% increase in frequency. The effect of a sound source moving away from the listener at a relative 200 km/h will result in a frequency shift to about 400 Hz to about 1,200 Hz. As another example, FIG. 8 shows the variation in frequency of two sirens sweeping through their range, where the two sirens have different periodicities.

Figure 8:
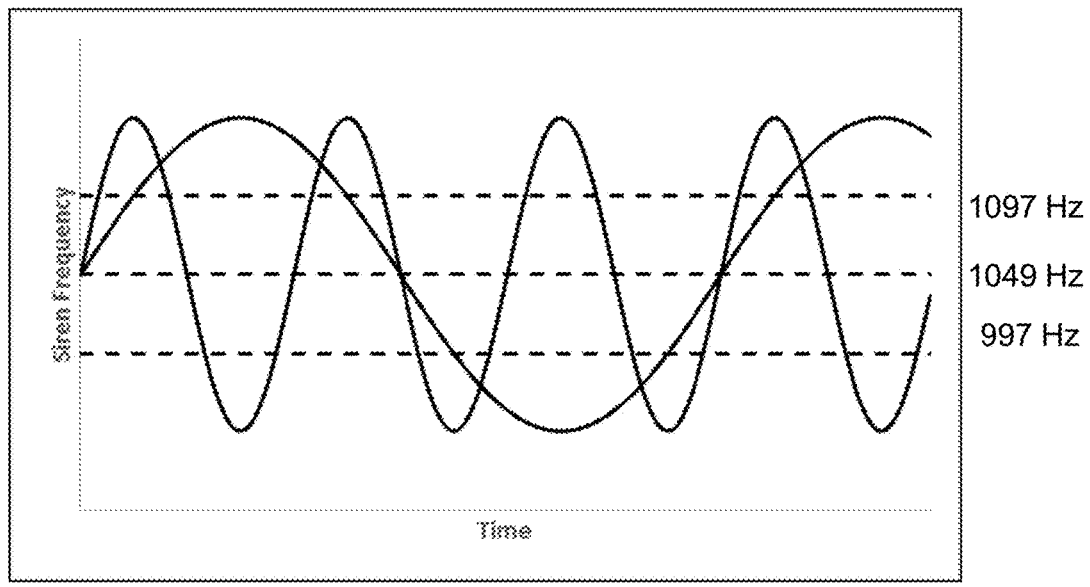
FIG. 8 is a chart showing an example of the frequency variation over time for two siren sweeps of different periodicities, and three detection frequencies.

In one preferred embodiment, the detection frequency is 1049 Hz, as shown by the middle dashed lines in FIGS. 7 and 8. More preferably, the system will look for a plurality of specific detection frequencies, for example, three or more specific frequencies, some or all of which are prime numbers in the central range between about 600 Hz to about 1200 Hz. For example, the system may be tuned to look specifically for frequencies of 997 Hz, 1049 Hz and 1097 Hz, as shown in FIGS. 7 and 8. Accordingly, the effect of the Doppler shift in FIG. 7, and the effect of different periodicities in FIG. 8, may be ignored as the siren will pass through the detection frequency range bounded by the upper and lower dashed lines through each sweep either upwards or downwards through the frequency range, and the narrow frequency ranges will encompass any Doppler-shifted variation of an alternating siren.

In this case, the specificity of a template to a particular frequency depends on the sampling rate of the system and on the length of the template. For example, with a sampling rate of 10 kHz and using a 64-bit sample template, it was found that a system (100) would detect frequencies in a bandwidth of about ±50 Hz around the specific frequency of the template. Therefore, in one example, where the system is configured to detect a siren which alternates between two frequencies, the templates may be derived from specific frequencies spaced apart in intervals less than about 50 Hz, within the narrow frequency range centered on the matched frequency. Preferably, the specific frequencies are prime numbers, to reduce the possibility of false positives resulting from harmonic overtones of non-siren noise.

The number of templates used and the frequencies they represent can be tailored to best suit the frequency range of sounds meant to be detected. For example, if the expected sirens are known to sweep over a given range, then the templates chosen should consist of frequencies near the center of that range, such that Doppler-shifted versions of the sirens will still pass through them. For sirens with a long period, having a number of frequency templates spread over a larger range will increase the number of times one of them is crossed, allowing direction to be calculated more often. For alternating sirens that switch discretely (as opposed to sweeping) between different frequencies, templates may be chosen to be closely spaced in the vicinity of the two tones such that the system will always detect a switch between at least two of templates even if the siren is Doppler-shifted.

Comparator.

The comparator (112) compares the stored digital sample vector to at least one, and preferably most or all of the plurality of digital target sound templates (FIG. 3, step 310), using a logic gate (FIG. 3, step 312). As an example, the logic gate may be an exclusive NOR (XNOR) gate. This comparison of the sampled sound to a template sound is a primary recognition method.

Correlator.

The correlator (114) sums the output of the logic gate of the comparator (112) to determine a measure of how well an incoming sample digital sample vector matches with a digital target template (FIG. 3, step 314). The sum is a value indicating the degree of similarity between the sample vector and a template. A threshold value may be chosen, which when exceeded is indicative of the sample vector matching a template, and therefore the target sound being detected. If the maximum sum for the sample vector exceeds a predefined threshold value (FIG. 3, step 316), then the system (100) will (subject to any confirmation strategies, as discussed below) provide a notification that a target sound matching a stored template has been detected (FIG. 3, step 322).

Figure 9:
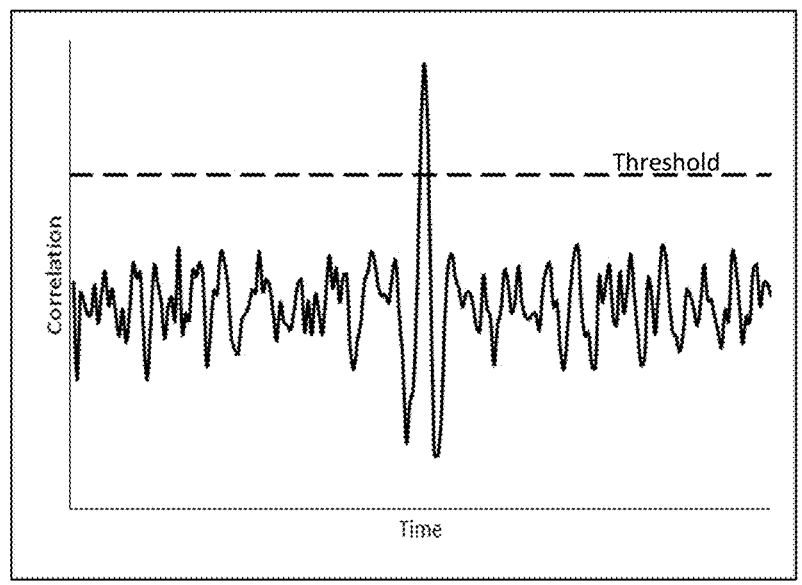
FIG. 9 is a chart showing an example of the output over time of a correlator of the present invention, with a correlation spike.

For example, FIG. 9 shows an example of the output of a correlator (114), which output includes a correlation spike above the threshold value. Preferably, these sums are calculated and continuously determined for each audio sensor (102) over time at the predefined sampling rate, along with a counter for the time index of the samples. For example, when comparing sample vectors and template vectors produced with a one bit conversion, a value of 50% will represent random noise. A degree of similarity which indicates with some confidence of a match may be used, for example, 51% or greater, preferably 55% or more, for example, may indicate a match. Therefore, in an exemplary system using 4000 bit length vectors, a threshold value may be 2200 bit matches in the vector.

Figure 10A:
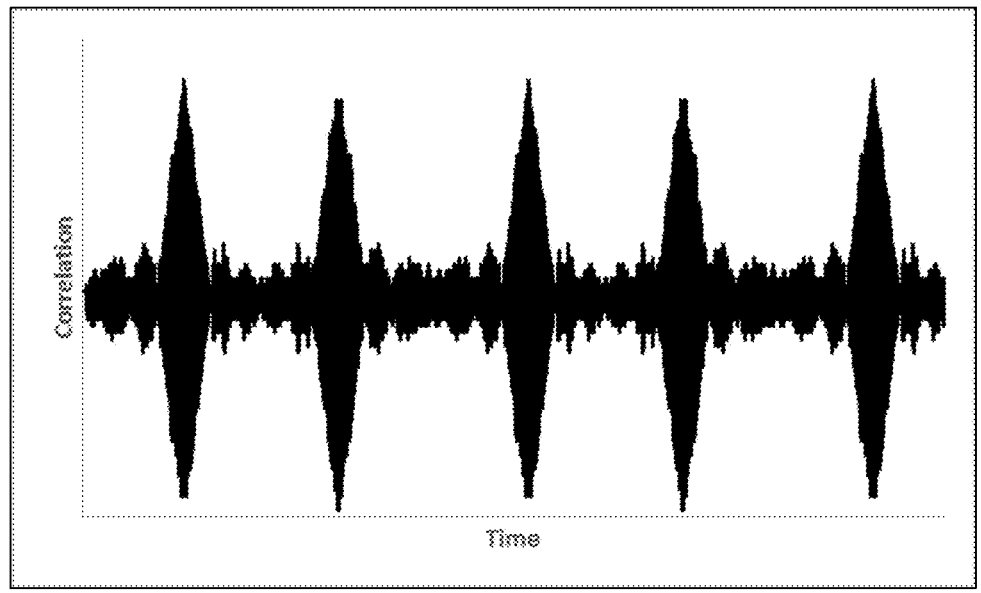
FIG. 10A is a chart showing an example of the output over time of a correlator of the present invention with periodic correlation peaks.
Figure 10B:
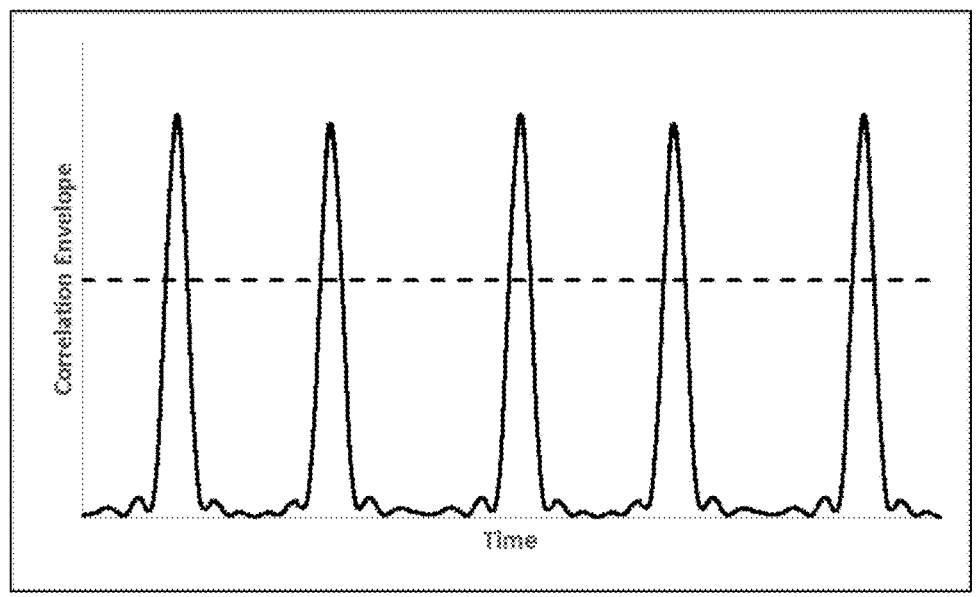
FIG. 10B is a chart showing an example of the calculated correlation envelope for the chart of FIG. 10A.

FIG. 10A shows another example of the output of a logic gate of the correlator (104). As the correlation goes in and out of phase with the template, the output of the logic gate shows a number of closely spaced peaks that go up and down in amplitude over time. In order to reduce noise, an optional envelope detection step (analogous to a running average), preferably with a squaring function, converts the correlation into a single peak, as shown in FIG. 10B. The maximum possible envelope peak depends on the length of the template and on the amount of time the siren spends at the template frequency. For example, it has been found that with a 64-bit long template, most sweeping sirens tested will yield correlation sum envelope peaks up to about 40,000 to 50,000. When the envelope calculator output crosses the detection threshold, as shown by the dotted line in FIG. 10B, the template frequency was detected in the sample vector. The detection threshold should be set at a value where the envelope calculator output passes through it quickly in order to minimize timing errors. For example, it was found empirically that suitable detection thresholds should be set at about 50% to about 70% of the theoretical maximum peak envelope value.

Confirmation Strategies.

The system may generate a false positive detection of a target sound if the target sound has a frequency that is generated by a source other than an intended source such as a siren. Also, as noted above, the system may be more prone to false positives as the size of the sample vector decreases and/or number of templates increases. Accordingly, additional algorithms and data processing using the available information, i.e. secondary patterns, may be used to distinguish the sounds of interest from false positives, and provide confirmation of the detected sound. Various combinations of such confirmation strategies may be employed.

In one embodiment, the energy detector (116) is used to measure the energy level (amplitude) of the audio signal to provide confirmation of a positive target sound detection, by confirming that the detected target signal has sufficient energy to be a target sound in proximity to the vehicle (10). That is, a measure of energy in the sound wave at the target frequency may be used as it may be expected that a target sound such as a siren will be louder than other sounds in the environment. In one embodiment, the analog log amp (106) output is proportional to the sound energy. This log transformation is analogous to a biological hearing system where the sound is defined in terms of decibels (dB). Decibels are a logarithmic measure of either the sound pressure or the sound energy. By simple proportional scaling, the log amp (106) readings can be scaled to pressure dB or sound energy dB in the energy detector (116). This can be achieved with a simple mathematical operation or by a suitable lookup table. The lookup table can be computationally simpler where the sound is scaled by the log amp (106). Having the dB level or a dual of it from the A/D converter (108) allows further processing such as determining threshold levels of near and far sirens, for example. This can be done with the aid of the log amp (106) without necessitating floating point or extended math computations, because the log amp (106) produces levels analogous to a biological system, which is both extremely sensitive and yet has high dynamic range.

Energy or amplitude detection may be used in a number of different manners. For example, where multiple microphones are placed around a vehicle, and are directional either by design or placement, energy differences may provide confirmation or rejection of false positives.

In another embodiment, where the siren sweeps through a frequency range such as shown in FIG. 7, a number of specific frequencies may be detected in a specific order: from low to high and then reversed from high to low. The detection of the target frequencies in order, within a limited time, may be used as confirmation that a siren has in fact been detected. In one exemplary embodiment, pattern detection of a frequency sweep using smaller sample vectors (for example, n=64 bits) at each frequency level provides very accurate discrimination of positive hits.

In another embodiment, the system (100) may be configured to require a confirmatory match from more than one audio sensor (102) to reduce false positive reporting.

Figure 11:
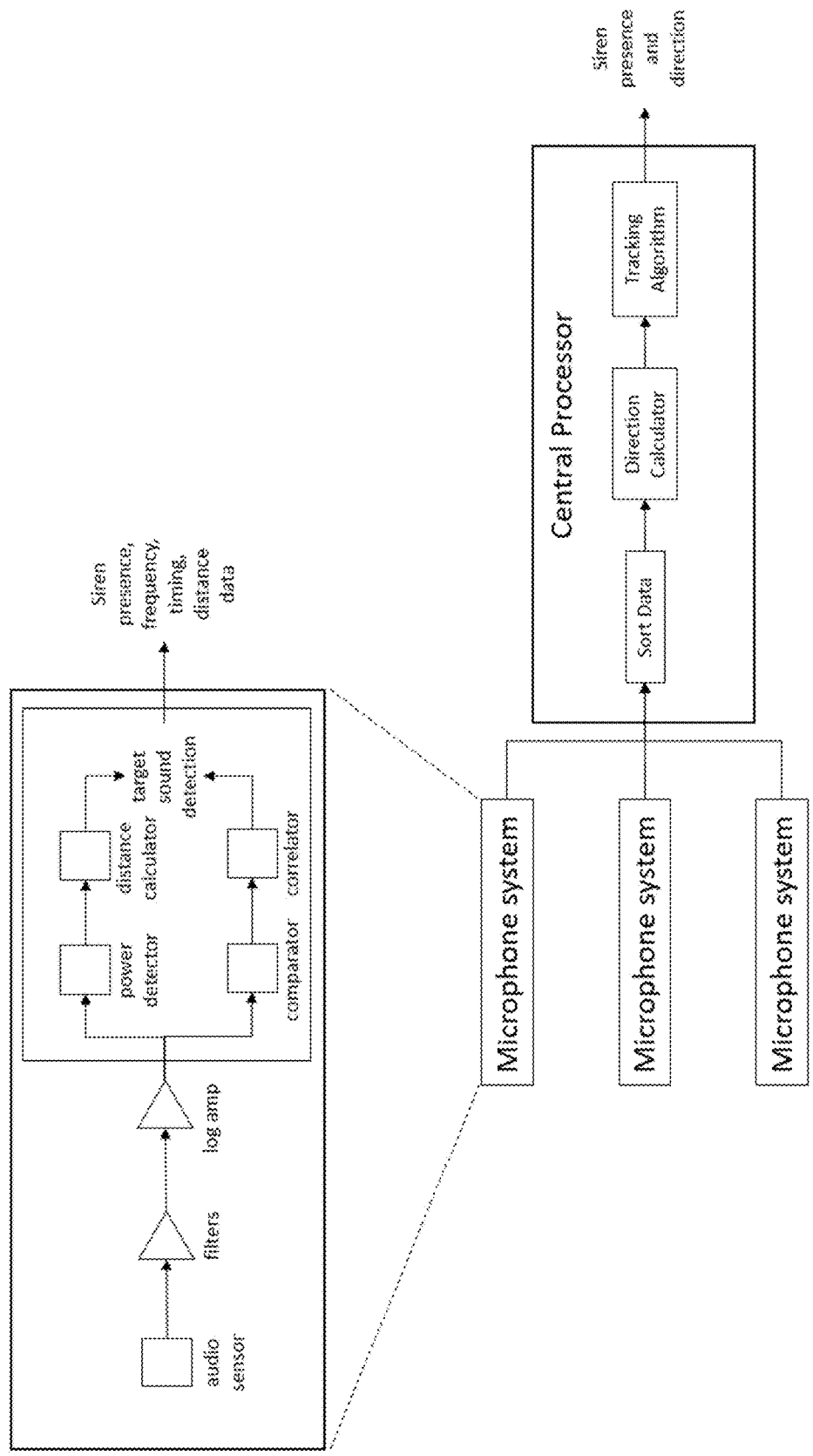
FIG. 11 is a flow chart of an embodiment of a method of the present invention for detecting a siren sound, including parallel processing of sample sound signals generated by multiple microphones, confirmation of a detected siren sound, and direction determination of the detected siren sound.

As shown in FIG. 11, each microphone may be packaged with an analysis module, which will output a positive signal when a signal vector matches a template. The output of each microphone system is aggregated by a central processor, which uses at least one, and preferably a combination of confirmatory algorithms as described herein.

Analysis of Target Sound Direction.

FIG. 11 shows a schematic of a system which includes a direction calculator, using parallel processing of audio sample sound signals in a system having multiple microphones. Because the spacing of the microphones is both limited and known, a genuine siren will produce a primary match at a slightly different time index for each microphone. If a target sound is detected, then the system (100) can proceed to use the indices representing the time the maximum sums were detected to determine the time differences between the signals' arrivals at the respective microphones. The time differences may be used in a trigonometric calculation to derive the direction angle of the incoming sound with respect to the microphones. This computation requires a minimum of two microphones to provide basic information, but as noted above, at least three and preferably four or more microphones could be used to improve the safety, reliability and robustness of the system (100).

In one embodiment, information regarding the direction and velocity of the incoming sound may be derived from two microphones, where a time differential or an amplitude differential is detected between the two microphones. In a more basic implementation, a minimum of two microphones may still provide basic localization information, such as simple "left or right" or "ahead or behind" information.

Hence, the system (100) will report whether or not a target sound is present, and the direction of the sound, every time a suitable number of samples vectors have been processed. The greater the number of samples, and the greater the size of the sample vector is, the more robust and accurate the method may be in recognizing whether or not received sounds are target sounds, but at the cost of signal processing time and resources, as well as response time of the system in recognizing the siren signals.

However, the inventors have found that a putative loss in accuracy resulting from small sample vectors, using bit-wise encoding, such as 1-bit encoding, is overcome by the ability to process signals against a large number of templates in real-time or near-real-time, by detecting or recognizing secondary patterns. Those secondary patterns include the signal energy and energy changes over time, time-of-arrival differentials described above, ascending or descending sweeps through a frequency range, or combinations thereof.

Analysis of Target Sound Source Movement.

In embodiments, information regarding the relative movement of the emergency vehicle (14) may be determined.

In one embodiment, the direction angle of the incoming sound may be tracked over time, which may indicate the direction of travel of the emergency vehicle (14). Additionally, the degree of correlation may increase as a function of distance from the incoming sound. Further, if the templates include Doppler-shifted variations, a specific match to a Doppler-shifted variation would also give information regarding relative speed and direction of movement of the emergency vehicle (14). For example, a match to a higher-pitched variation of a known siren would indicate that the source emergency vehicle (14) is moving towards the vehicle (10).

In another embodiment, if the digital conversion of the sound contains amplitude-derived data, or a separate energy detector of the analog signal before digital conversion is used, then a measure of energy or amplitude may be correlated to direction and/or velocity of the incoming sound. For example, a sound which gets louder over time is likely moving in a direction towards the microphone.

Output Notification.

In embodiments, the system (100) may be operatively connected to a vehicle control system that could take control of the vehicle (10), or direct the driver to take appropriate actions to control the dynamics of the vehicle (10). Hence, the system (100) may reduce or eliminate the need for interaction of a human driver in aspects of vehicle operation. The invention may be used for any SAE level of automated driving.

In embodiments, the system (100) may be operatively connected to a vehicle control system that generates visual, audible, or haptic notifications within the vehicle, or at a remotely-located entity. Hence, the system (100) may provide sensory support for a human driver.

For example, the system (100) could override the vehicle audio system to provide a notification. In addition, or alternatively, the system (100) could provide a warning light on the dashboard or in the instrument display of the vehicle (10). The notification could include information such as direction relative to the vehicle, and speed and direction of travel of the incoming sound. In addition or alternatively, the system (100) may be operatively connected to an in-vehicle navigation system displaying digital maps of the vehicle's surroundings. The location, speed and direction of movement of the emergency vehicle may be illustrated on the map of the subject vehicle. In one embodiment, the presence of an emergency vehicle and/or the movement of the emergency vehicle in a certain direction maybe shared with other vehicles through crowd sourced high definition maps. The emergency vehicle notification in the navigation system would disappear when the siren is turned off or becomes too distant to be of concern.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A method for detection of a target sound, the method comprising the steps of:
   (a) receiving a sample sound signal generated by at least one audio sensor in response to a sample sound wave;
   (b) converting the sample sound signal to a digital sample vector in accordance with conversion parameters;
   (c) comparing the sample vector to at least one template produced from the target sound using the same conversion parameters to determine if a degree of similarity of the vector to the at least one template exceeds a predetermined threshold value; and
   (d) generating an output signal if the threshold value is exceeded.

2. The method of claim 1, wherein the at least one audio sensor comprises at least two audio sensors, and the method comprises:
   (a) for each of the at least two audio sensors, performing steps (a) to (c) of claim 1, and determining a time index for an exceedance of the threshold value; and
   (b) determining a direction of the target sound based on a difference between the determined time indices.

3. The method of claim 1, wherein the target sound is a siren that sweeps between lower and upper frequency limits, and the templates represent data limited to either:
   (a) a narrow frequency band within the lower and upper frequency limits; or
   (b) at least one specific frequency within the narrow frequency band.

4. The method of claim 3, wherein the narrow frequency band is from about 600 Hz to about 1400 Hz.

5. The method of claim 3, wherein the at least one specific frequency comprises a plurality of specific frequencies, at least one, some or each of which is a prime number.

6. The method of claim 1, wherein the target sound is a siren that alternates between a lower frequency and an higher frequency, and the templates represent data limited to either:
   (a) a lower narrow frequency band centered on the lower frequency, and a higher narrow frequency band centered on the higher frequency; or
   (b) at least one specific frequency within each of the lower and higher narrow frequency bands.

7. The method of claim 6, wherein the lower and higher frequency bands provide a range from about 20% below to about 20% above the lower and higher frequencies, respectively.

8. The method of claim 1, further comprising the step of logarithmically amplifying the sample sound signal before being converted to the sample vector.

9. The method of claim 1 wherein the conversion parameter comprises an n-bit encoding of the sound signal, wherein n is less than or equal to 8.

10. The method of claim 9 wherein n is 1, 1.5 or 2.

11. The method of claim 10 wherein n is 1, and the conversion parameter is a voltage level crossing.

12. The method of claim 1, wherein one or both of the sample vector and the target sound template is less than about 10,000 bits long, or 5000 bits long, or 1000 bits long, or 100 bits long.

13. The method of claim 1, wherein steps (a) to (d) are performed on-board a vehicle in real-time, and the target sound is produced by a siren.

14. The method of any one of claim 1 wherein steps (b) and (c) involve only integer math.

15. A system for detection of a target sound, the system comprising:
   at least one audio sensor for generating a sample sound signal in response to a sample sound wave;
   a computer processor operatively connected to the at least one audio sensor; and
   a non-transitory computer readable memory operatively connected to the computer processor, and storing a plurality of digital target sound templates produced by converting a plurality of samples of the target sound in accordance with conversion parameters, and a set of instructions executable by the computer processor to implement the method of claim 1.

16. A continuous method of detecting a target sound in real time, comprising the steps of:
   (a) receiving sample sound signals generated by at least one audio sensor in response to sample sound waves;
   (b) logarithmically amplifying the sample sound signals and converting the amplified sample sound signals to a digital sample vector in accordance with conversion parameters;
   (c) comparing the sample vector to at least one digital target sound template produced from the target sound using the same conversion parameters to determine if a degree of similarity of the vector to the at least one template exceeds a predetermined threshold value; and
   (d) generating an output signal if the threshold value is exceeded.

17. The method of claim 16 wherein step (c) involves only integer math.

18. The method of claim 16 comprising the further step of notifying a vehicle user and/or a vehicle control system.

19. The method of claim 18 wherein the step of notifying a vehicle user comprises displaying an emergency vehicle location and optionally speed and direction of movement on a digital map.

20. A system for detection of a target sound, the system comprising:
- at least one audio sensor for generating a sample sound signal in response to a sample sound wave;
- a logarithmic amplifier operatively connected to the audio sensor for amplifying the sample sound signal;
- a computer processor operatively connected to the at least one audio sensor and the logarithmic amplifier; and
- a non-transitory computer readable memory operatively connected to the computer processor, and storing a plurality of digital target sound templates produced by converting a plurality of samples of the target sound in accordance with conversion parameters, and a set of instructions executable by the computer processor to implement the method of claim 16.

\* \* \* \* \*